US007983896B2

(12) United States Patent
Ross et al.

(10) Patent No.: US 7,983,896 B2
(45) Date of Patent: Jul. 19, 2011

(54) IN-CONTEXT EXACT (ICE) MATCHING

(75) Inventors: Russ Ross, Wolfson College (GB);
Kevin Gillespie, Dorchester, MA (US)

(73) Assignee: SDL Language Technology, Los Angeles, CA (US)

( * ) Notice: Subject to any disclaimer, the term of this patent is extended or adjusted under 35 U.S.C. 154(b) by 664 days.

(21) Appl. No.: 11/071,706

(22) Filed: Mar. 3, 2005

(65) Prior Publication Data
US 2005/0197827 A1 Sep. 8, 2005

Related U.S. Application Data

(60) Provisional application No. 60/550,795, filed on Mar. 5, 2004.

(51) Int. Cl.
*G06F 17/28* (2006.01)

(52) U.S. Cl. ........... 704/2; 707/3; 715/268; 715/532; 715/708; 341/107; 704/235; 704/260; 704/270; 704/277; 704/4; 704/5; 704/9

(58) Field of Classification Search .......... 704/4, 9, 704/260, 251, 2, 235, 270, 277, 5; 341/107; 715/708, 532, 268; 707/3
See application file for complete search history.

(56) References Cited

U.S. PATENT DOCUMENTS

| 5,301,109 | A | * | 4/1994 | Landauer et al. ............ 704/9 |
| 5,325,298 | A | * | 6/1994 | Gallant ........................ 704/9 |
| 5,418,717 | A | * | 5/1995 | Su et al. ....................... 704/9 |
| 5,490,061 | A | * | 2/1996 | Tolin et al. ................... 704/9 |
| 5,510,981 | A | * | 4/1996 | Berger et al. ................ 704/9 |
| 5,642,522 | A | * | 6/1997 | Zaenen et al. ............... 704/9 |
| 5,710,562 | A | * | 1/1998 | Gormish et al. ........... 341/107 |
| 5,842,204 | A | * | 11/1998 | Andrews et al. ............ 707/3 |
| 5,950,194 | A | * | 9/1999 | Bennett et al. ........... 704/251 |
| 6,304,846 | B1 | * | 10/2001 | George et al. ............. 704/270 |
| 6,353,824 | B1 | * | 3/2002 | Boguraev et al. .......... 704/9 |
| 6,442,524 | B1 | * | 8/2002 | Ecker et al. ................. 704/9 |
| 6,687,671 | B2 | * | 2/2004 | Gudorf et al. ............. 704/235 |
| 7,533,338 | B2 | * | 5/2009 | Duncan et al. ............ 715/268 |
| 7,594,176 | B1 | * | 9/2009 | English .................... 715/708 |
| 2002/0099547 | A1 | * | 7/2002 | Chu et al. .................. 704/260 |
| 2004/0122656 | A1 | * | 6/2004 | Abir .............................. 704/4 |
| 2005/0021323 | A1 | * | 1/2005 | Li ................................. 704/5 |

* cited by examiner

*Primary Examiner* — Richemond Dorvil
*Assistant Examiner* — Michael C Colucci
(74) *Attorney, Agent, or Firm* — Carr & Ferrell LLP

(57) ABSTRACT

Methods, systems and program product are disclosed for determining a matching level of a text lookup segment with a plurality of source texts in a translation memory in terms of context. In particular, the invention determines any exact matches for the lookup segment in the plurality of source texts, and determines, in the case that at least one exact match is determined, that a respective exact match is an in-context exact (ICE) match for the lookup segment in the case that a context of the lookup segment matches that of the respective exact match. The degree of context matching required can be predetermined, and results prioritized. The invention also includes methods, systems and program products for storing a translation pair of source text and target text in a translation memory including context, and the translation memory so formed. The invention ensures that content is translated the same as previously translated content and reduces translator intervention.

36 Claims, 6 Drawing Sheets

US 7,983,896 B2

IN-CONTEXT EXACT (ICE) MATCHING

This application claims the benefit of U.S. Provisional Application No. 60/550,795, filed Mar. 5, 2004.

BACKGROUND OF THE INVENTION

1. Technical Field

This invention relates generally to processing content, and more particularly, to ensuring an exact translation match to source content including context to simplify and otherwise facilitate translation and other processing functions associated with the content.

2. Related Art

As information becomes more accessible on a global basis, especially given the advent and rapid utilization of the Internet and the World-Wide-Web, the role of translation has shifted away from simple transcription of source text into a target language. Translators today must ensure the timely and accurate deployment of the translated content to designated sites and customers. As such, the increased need for content translation has prompted numerous companies to develop tools that automate and aid in part of the translation process. Given that translators seek to translate content as quickly as possible, translation can be made more efficient with the greater flexibility in software functionality and the ability to save previous translations for future use. Therefore, tools have been created to save translations, including blocks and/or segments of translations, in computer memory ("translation memory" or "TM").

Translation memories, also known as translation databases, are collections of entries where a source text is associated with its corresponding translation in one or more target languages. Translation memory includes a database that stores source and target language pairs of text segments that can be retrieved for use with present texts and texts to be translated in the future. Typically, TMs are used in translation tools: when the translator "opens" a segment, the application looks up the database for equivalent source text. The result is a list of matches usually ranked with a score expressing the percentage of similarity between the source text in the document and in the TM. The translator or a different TM system provides the target text segments that are paired with the lookup segments so that the end product is a quality translation.

There are many computer-assisted translation ("CAT") tools available to assist the translator, such as bilingual and multilingual dictionaries, grammar and spell checkers and terminology software, but TM goes one step further by making use of these other CAT tools while at the same time matching up the original source document stored in its database with the updated or revised document through exact and fuzzy matching. An exact match (100% match) is a match where there is no difference (or no difference that cannot be handled automatically by the tool) between the source text in the document and the source text in the TM. A fuzzy match (less than 100% match) is a match where the source text in the document is very similar, but not exactly the same, as the source text in the TM. Duplicated exact matches are also often treated as fuzzy matches. A TM system is used as a translator's aid, storing a human translator's text in a database for future use. For instance, TM can be utilized when a translator translates the original text, using translation memory to store the paired source and target segments. The translator could then reuse the stored texts to translate the revised or updated version of the text. Only the segments of the new text that do not match the old one would have to be translated. The alternative would be to use a manual translation system or a different CAT system to translate the original text. The TM system could then be used by a translator to translate the revision or update by aligning the texts produced by a translator or other CAT system and storing them in the TM database for present and future work. The translator could then proceed to translate only the segments of the new text, using TM as described above.

There are many advantages in using TMs: The translation can go much faster, avoid unnecessary re-typing of existing translations, and/or enable a translator to change only certain parts of the text. TMs also allow a better control of the quality of the translation. In the related art, TM was employed to speed the translation step in large batch projects. For example, a software company may release version 1 of its software product and need to translate the accompanying documentation. The documentation is broken into sentences and translated, with all sentence pairs captured in TM. Two years later the company releases version 2 of its software. The documentation has changed significantly, but there is also a significant portion similar to the original documentation. This time, as translators translate the documentation, their work is reduced through leveraging exact and fuzzy matches from the TM. As this example illustrates, TM is typically used as an aid in a pipeline process. In the related art, there are also some limitations with the utilization of TM.

Automatically leveraging translation using exact matches (without validating them) can generate incorrect translation since there is no verification of the context where the new segment is used compared to where the original one was used: this is the difference between true reuse and recycling. In the related art, TM systems are recycling systems. With Web content, and now with many types of content, it is common for a document to be translated, and then have minor changes made to it, and then have need for it to be translated again. For example, a web document listing the advantages of a product might be translated, but then a new advantage might be added and the document would therefore need to be translated again. In the related art, TM would reduce the effort of translating the document a second time. Exact matches for most sentences would exist where the source text was identical to one or more entries in the TM. The translator then makes sure that the right exact match is chosen for each by evaluating the appropriateness of a match to contextual information. However, the related art does not provide for a determination of content context. In addition, within the related art, there is no automated process for accurately choosing the best exact match for a given segment or validating whether a given exact match is an appropriate match for the context to which it is being applied. As such, a translator is required to validate matches. The fact that a translator needs to validate and possibly perform an action for every sentence when just a few words may have changed, given that under the related art a segment may be translated differently under different circumstances or contexts, is grossly inefficient.

In view of the foregoing, there is a need in the art for an automated process which accurately validates whether a given exact match is an appropriate match for the context to which it is being applied.

SUMMARY OF THE INVENTION

The invention includes methods, systems and program product for determining a matching level of a text lookup segment with a plurality of source texts in a translation memory in terms of context. In particular, the invention determines any exact matches for the lookup segment in the plurality of source texts, and determines, in the case that at least one exact match is determined, that a respective exact match is an in-context exact (ICE) match for the lookup segment in the case that a context of the lookup segment matches that of the respective exact match. The degree of context matching required can be predetermined, and results prioritized. The invention also includes methods, systems and program products for storing a translation pair of source text and target text in a translation memory including context, and the translation memory so formed. The invention ensures that content is translated the same as previously translated content and reduces translator intervention.

A first aspect of the invention is directed to a method of determining a matching level of a plurality of source texts stored in a translation memory to a lookup segment to be translated, the method comprising the steps of: determining any exact matches for the lookup segment in the plurality of source texts; and determining, in the case that at least one exact match is determined, that a respective exact match is an in-context exact (ICE) match for the lookup segment in the case that a context of the lookup segment matches that of the respective exact match.

A second aspect of the invention includes a system for determining a matching level of a plurality of source texts stored in a translation memory to a lookup segment to be translated, the system comprising: means for determining any exact matches for the lookup segment in the plurality of source texts; and means for determining, in the case that at least one exact match is determined, that a respective exact match is an in-context exact (ICE) match for the lookup segment in the case that a context of the lookup segment matches that of the respective exact match.

A third aspect of the invention related to a program product stored on a computer readable medium for determining a matching level of a plurality of source texts stored in a translation memory to a lookup segment to be translated, the computer readable medium comprising program code for performing the following steps: determining any exact matches for the lookup segment in the plurality of source texts; and determining, in the case that at least one exact match is determined, that a respective exact match is an in-context exact (ICE) match for the lookup segment in the case that a context of the lookup segment matches that of the respective exact match.

A fourth aspect of the invention is directed to a method of storing a translation pair of source text and target text in a translation memory, the method comprising the steps of: assigning a context to the translation pair; and storing the context with the translation pair.

A fifth aspect of the invention is directed to a system for storing a translation pair of source text and target text in a translation memory, the system comprising: means for assigning a context to the translation pair; and means for storing the context with the translation pair.

A sixth aspect of the invention is relates to a program product stored on a computer readable medium for storing a translated text segment for storage in a translation memory, the computer readable medium comprising program code for performing the following steps: assigning a context to the translated text segment; and storing the context with the translated text segment.

A seventh aspect of the invention includes translation memory comprising: a plurality of source texts for comparison to a lookup segment; and a context identifier for each source text.

An eighth aspect of the invention relates to a client-side system for interacting with a translation system including a translation memory, the system comprising: means for assigning a segment identifier to a segment to be translated by the translation system, the segment identifier indicating a usage context of the segment; and means for communicating the segment identifier assignment for storage as part of the translation memory.

A ninth aspect of the invention includes a program product stored on a computer readable medium for interacting with a translation system including a translation memory having a plurality of source texts, the computer readable medium comprising program code for performing the following steps: assigning a segment identifier to a segment to be translated by the translation system, the segment identifier indicating a usage context of the segment; and communicating the segment identifier assignment for storage as part of the translation memory.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION

Figure 1:
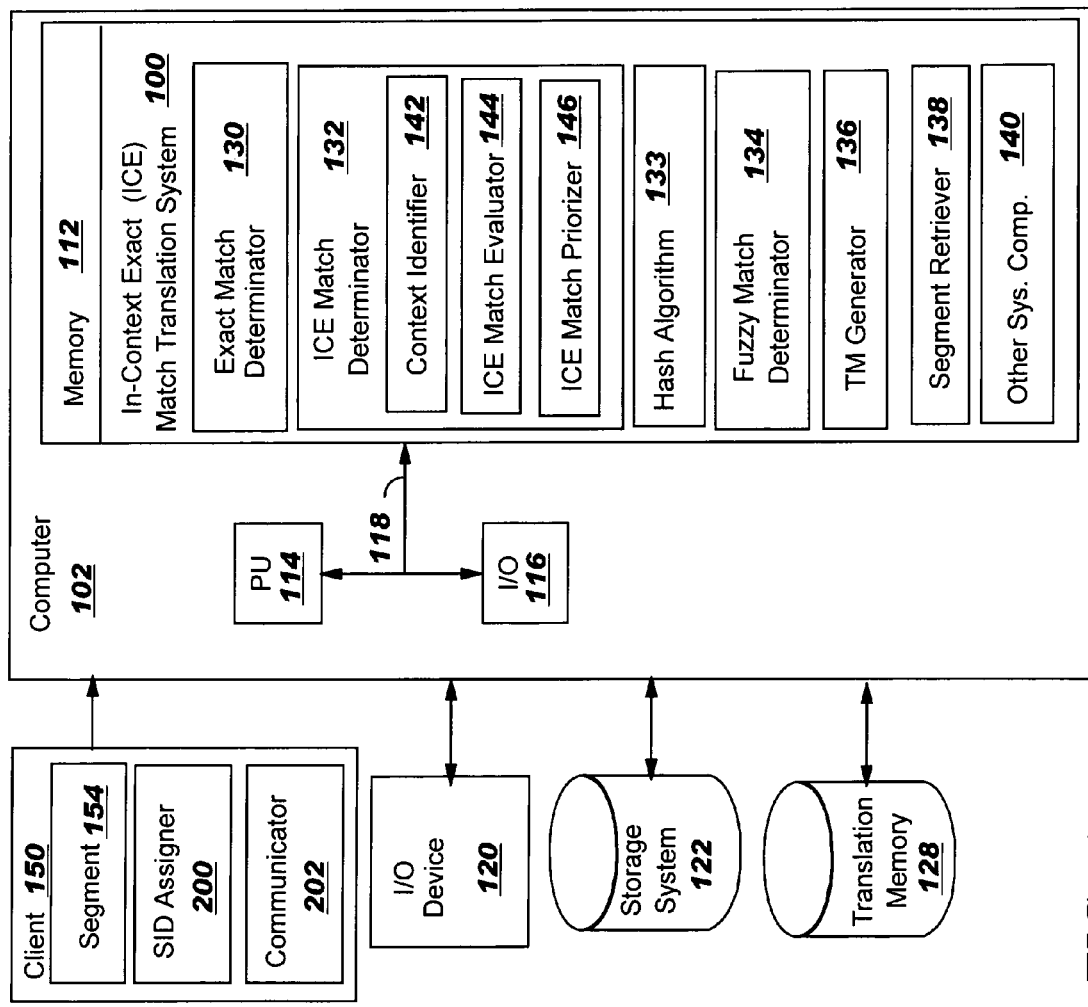
FIG. 1 shows a block diagram of a computer system using an ICE match translation system according to the invention.

The detailed description includes the following headings for convenience purposes only: I. Definitions, II. General Overview, III. System Overview, IV. Operational Methodology, and V. Conclusion.

I. Definitions

"Asset" means a content source defining a bound collection of related content or grouping of text segments, e.g., by context, usage, size, etc. In general, an asset is associable to a document, such as a hypertext markup language (HTML) file, a Microsoft® Word® document, or a simple text file. However, some assets do not correspond to file system files. The asset may in fact be defined from the columns of a database table or the structures within an extensible markup language (XML) repository. Regardless of how they are represented physically, they all share the common purpose—defining a bound collection of related content that can be accessed, manipulated, and ultimately, translated. An asset may contain content, formatting information, and internal structural data that depends on the nature of the asset.

"Source asset" refers to the asset from which a lookup segment is drawn.

"Segment" includes a translatable chunk of content, e.g., a phrase, sentence, paragraph, etc. It represents the smallest unit of translation work. In practice, a segment can represent a paragraph, a sentence or even a sentence fragment. Segments typically are not single words, though single word segments can be used.

"Source text" refers to the text within the translation memory that corresponds to the original (source) language, which is the language being translated. The source text is compared to the lookup segment from the asset to during the match lookup process in order to find a match.

"Target text" includes the translation of the source text for a particular locale, i.e., it is one half of a translation memory (TM) entry.

"Translation memory" (abbreviated TM) includes a repository including TM entries. A TM can include TM entries for any number of locales. For example, it can contain entries for English-to-French, Greek-to-Russian, Albanian-to-Turkish, etc.

"TM entry" includes a translation pair stored in the translation memory that maps source text to target text. It is specific for a given translation pair, which includes a source text and target text locale pair, and is usually associated with the asset whose translation produced this translation pair. In effect, a TM entry represents a previous translation, which can be reused later. In addition, each TM entry according to the invention includes a context portion that identifies the context of the related source text and target text pair.

"Exact match" means a source text that contains source text that is completely identical to the lookup text from the asset at the moment it comes out of a translation memory. As used herein, exact matches also include 100% matches, which are similar to exact matches, but do not necessarily result from exact matches because of differences that exist in the translation memory entry. For example, a match can be scored as 100% without having been an exact match for one of the following reasons: 1) unscored whitespace differences—using a different type of space character from that of the TM entry will prevent it from being selected as an exact match, 2) configured penalties through which the invention effectively ignores certain differences between the source and lookup text, or 3) segment repair through which repair heuristics can be applied to fix differences between the TM match and the original lookup text.

"Context" means discourse that surrounds a text segment and helps to determine its interpretation. Context, as used herein, may include different levels. For example, context may include: a usage context level and an asset context level. Each different context may require different verbiage depending on the intended audience of the content.

"Usage context" refers to discourse that surrounds a segment and influences how the invention derives the appropriate translation for content—by considering the text surrounding the text to be translated. Typically, the usage context is defined in conjunction with surrounding content, which provides insight into the meaning of the segment to be translated. Usage context can also have levels in terms of text that precedes a particular segment and text that follow (post) a particular segment.

"Asset context" refers to discourse relative to the asset environment in which the segment exists, i.e., background and perspective framework of the overall content in which a text segment appears.

"In-context exact (ICE) match" for a lookup segment means the source text must be an exact match and shares at least one context level with the TM entry providing the match.

"Lookup text" refers to the segment of text from the source asset for which a TM match is to be sought.

"Segment identifier" (SID) includes a label that defines the usage context in which a given segment is to be translated, and is associated with content at creation of the content. A SID provides a context identification for the given segment. A SID may include marker tags that define segment boundaries. As described below, a SID is an alternative to basing the usage context on surrounding segments.

II. General Overview

The present invention provides methods, systems and program products for, inter alia, determining a matching level of a plurality of source texts stored in a translation memory to a lookup segment to be translated. The invention generates high quality matches for source content from previously stored translations in a translation memory (TM). In the related art, the best matches available were exact matches, i.e., matches where the source text was identical to one or more entries in the TM. However, there is no automated process for accurately choosing the best exact match for a given segment or validating whether a given exact match was an appropriate match for the context to which it is being applied. In particular, a segment may be translated differently under different circumstances or contexts. The appropriateness of an exact match requires evaluation of contextual information, which is based on the content usage (as defined by the sentences or segments surrounding it) as well as the asset context (which may require different verbiage depending on the intended audience.)

The current invention does not replace the exact match process. Instead, it provides a new level for matching, above exact matches, thus, employing a true reuse TM system which negates the need for manual validation and aids one in creating a TM which is as valuable as possible. In particular, one embodiment of the invention determines a matching level of a plurality of source texts stored in a translation memory to a lookup segment to be translated by determining any exact matches for the lookup segment in the plurality of source texts; and determining, in the case that at least one exact match is determined, that a respective exact match is an in-context exact (ICE) match for the lookup segment in the case that a context of the lookup segment matches that of the respective exact match. Accordingly, the ICE match determination determines the appropriateness of an exact match based on the context of the lookup segment. Those source texts that are exact matches and have a matching context are referred to as "in-context exact (ICE) matches." An ICE match is considered superior to an exact match in that it guarantees that the translation applied is appropriate for the context in which it is used. An ICE match is a translation match that guarantees a high level of appropriateness by virtue of the match having been previously translated in the same context as the segment currently being translated.

The invention leverages context information in order to: 1) determine the appropriateness of an exact match as a high quality (non-review requiring) match for new content, 2) select the best context match for a given lookup segment, and 3) guarantee that previously assigned translations for formerly translated content is always restorable. For new content, the invention leverages context information to find a high quality match from the TM based on segment usage context. The invention also ensures that the same content will always be translated the same way given its context—both on the asset and content level.

In terms of translation of a given lookup segment, suppose a source document is translated and all segments are stored in TM. If the exact same source document is then put through a second time, the document, including all its content, will be fully matched and the resulting translated document will be exactly the same as the first translated document. This behavior is straight forward, and expected. However, this can only be guaranteed as a result of using context information. To further understand the significance of this guarantee, consider a source document that has the same exact sentence repeated twice in two different places. Because the second usage may not have the same implied intentions as the first, it is translated differently. Now again consider an identical document being leveraged against the TM. Should the duplicated sentence have the same translation or should they differ as they did in the original document? Without taking the context of their usage into account, these sentences most likely would be translated the same by the TM. However, according to the invention, the context is considered, which guarantees that the two sentences will continue to have different translations as long as their usage context dictates such.

In terms of restoring previously translated text segments, the invention also ensures that the translations of new documents will not impact the ability to restore the translation of a formerly translated document, and provides a method of ensuring that translations are perfectly repeatable by leveraging a previously translated document against TM so that it will always result in the same translations as stored by the translator. Consider again two identical documents. The first document is translated, and the results are stored in the TM. When the second document is leveraged against the same TM, the document is presented as being fully translated with ICE matches. The usage context is identical to that of the first document. Now consider that the second document is targeted for a different audience. The source language text is not changed in this example since it is deemed suitable for both audiences. However, the translation into the target language requires some alterations. The translator updates the translations for this document, and stores the results into the TM. Time passes, and copies of both translated documents are again required. For space reasons, the original translated documents were deleted. Neither of the source documents has been altered, and thus, they still contain identical source text. The invention facilitates the regeneration of the original translated documents, each being identical to the originally translated documents (which themselves were not identical). Even though the content of the source documents is identical, the invention is able to leverage asset context information to ensure that the document specific translations are recoverable.

The invention may be exploited as part of a content management system such as Idiom's WorldServer™, or as a separate system. WorldServer™, for example, is a Web-based application that enables enterprises to manage their content in the context of the whole globalization process while leveraging established Web architecture, content management and workflow systems. Content management systems simplify the multiple complexities arising from deploying, for example, a global Web strategy, enabling a company's Website to efficiently support multiple countries and also different languages, locations and cultures. They provide structures and processes to collaboration among site managers, Web developers, content owners, translators and editors, resulting in a streamlined process, a synchronized global Web strategy and a coordinated global Web team. A translator uses a content management system to see what content he or she has to translate. In WorldServer™, the translator can either export the content needing translation to a third party editing tool, or use a translation workbench to perform the actual translation. A translator can be an individual contributor, including users that are adapting but not translating content and/or reviewers who review content. Content management systems store translated phrases into TM for later recall.

III. System Overview

With reference to the accompanying drawings, FIG. 1 is a block diagram of an in-context exact match translation system 100 in accordance with the invention. It should be recognized that while system 100 is shown as a separate system, it may be implemented as part of a larger content management or translation system such as Idiom's WorldServer™. In this regard, description of system 100 may include certain functionality of a translation system, but omit other functionality for clarity. In addition, it should be recognized that while system 100 is shown in a client-server (e.g., Web-based) environment, other arrangements are also possible.

System 100 is shown implemented on a computer 102 as computer program code. To this extent, computer 102 is shown including a memory 112, a processing unit 114, an input/output (I/O) interface 116, and a bus 118. Further, computer 102 is shown in communication with an external I/O device/resource 120 and a storage system 122. In general, processing unit 114 executes computer program code, such as system 100, that is stored in memory 112 and/or storage system 122. While executing computer program code, processing unit 114 can read and/or write data to/from memory 112, storage system 122, and/or I/O device 120. Bus 118 provides a communication link between each of the components in computer 102, and I/O device 120 can comprise any device that enables user to interact with computer 102 (e.g., keyboard, pointing device, display, etc.).

Alternatively, a user can interact with another computing device (not shown) in communication with computer 102. In this case, I/O interface 116 can comprise any device that enables computer 102 to communicate with one or more other computing devices over a network (e.g., a network system, network adapter, I/O port, modem, etc.). The network can comprise any combination of various types of communications links. For example, the network can comprise addressable connections that may utilize any combination of wireline and/or wireless transmission methods. In this instance, the computing devices (e.g., computer 102) may utilize conventional network connectivity, such as Token Ring, Ethernet, WiFi or other conventional communications standards. Further, the network can comprise one or more of any type of network, including the Internet, a wide area network (WAN), a local area network (LAN), a virtual private network (VPN), etc. Where communications occur via the Internet, connectivity could be provided by conventional TCP/IP sockets-based protocol, and a computing device could utilize an Internet service provider to establish connectivity to the Internet.

Computer 102 is only representative of various possible combinations of hardware and software. For example, processing unit 114 may comprise a single processing unit, or be distributed across one or more processing units in one or more locations, e.g., on a client and server. Similarly, memory 112 and/or storage system 122 may reside at one or more physical locations. Memory 112 and/or storage system 122 can comprise any combination of various types of computer-readable media and/or transmission media including magnetic media, optical media, random access memory (RAM), read only memory (ROM), a data object, etc. I/O interface 116 can comprise any system for exchanging information with one or more I/O devices. Further, it is understood that one or more additional components (e.g., system software, math co-processing unit, etc.) not shown in FIG. 1 can be included in computer 102. To this extent, computer 102 can comprise any type of computing device such as a network server, a desktop computer, a laptop, a handheld device, a mobile phone, a pager, a personal data assistant, etc. However, if computer 102 comprises a handheld device or the like, it is understood that one or more I/O devices (e.g., a display) and/or storage system 122 could be contained within computer 102, not externally as shown.

As discussed further below, system 100 is shown including an exact match determinator 130, an in-context exact (ICE) match determinator 132, a hash algorithm 133, a fuzzy match determinator 134, a translation memory TM generator 136, a segment retriever 138 and other system components (Sys. Comp.) 140. ICE match determinator 134 includes a context identifier 142, a match evaluator 144 and an ICE match prioritizer 146. Other system components 140 may include other functionality necessary for operation of the invention, but not expressly described herein. For example, other system components 140 may include an auto-translation system and/or content management system functionality such as that provided by Idiom's WorldServer™.

Although not shown for clarity in FIG. 1, it should be understood that client-side system 150 may include similar structure to computer 102, and include program code for providing functionality as described below.

Figure 3:
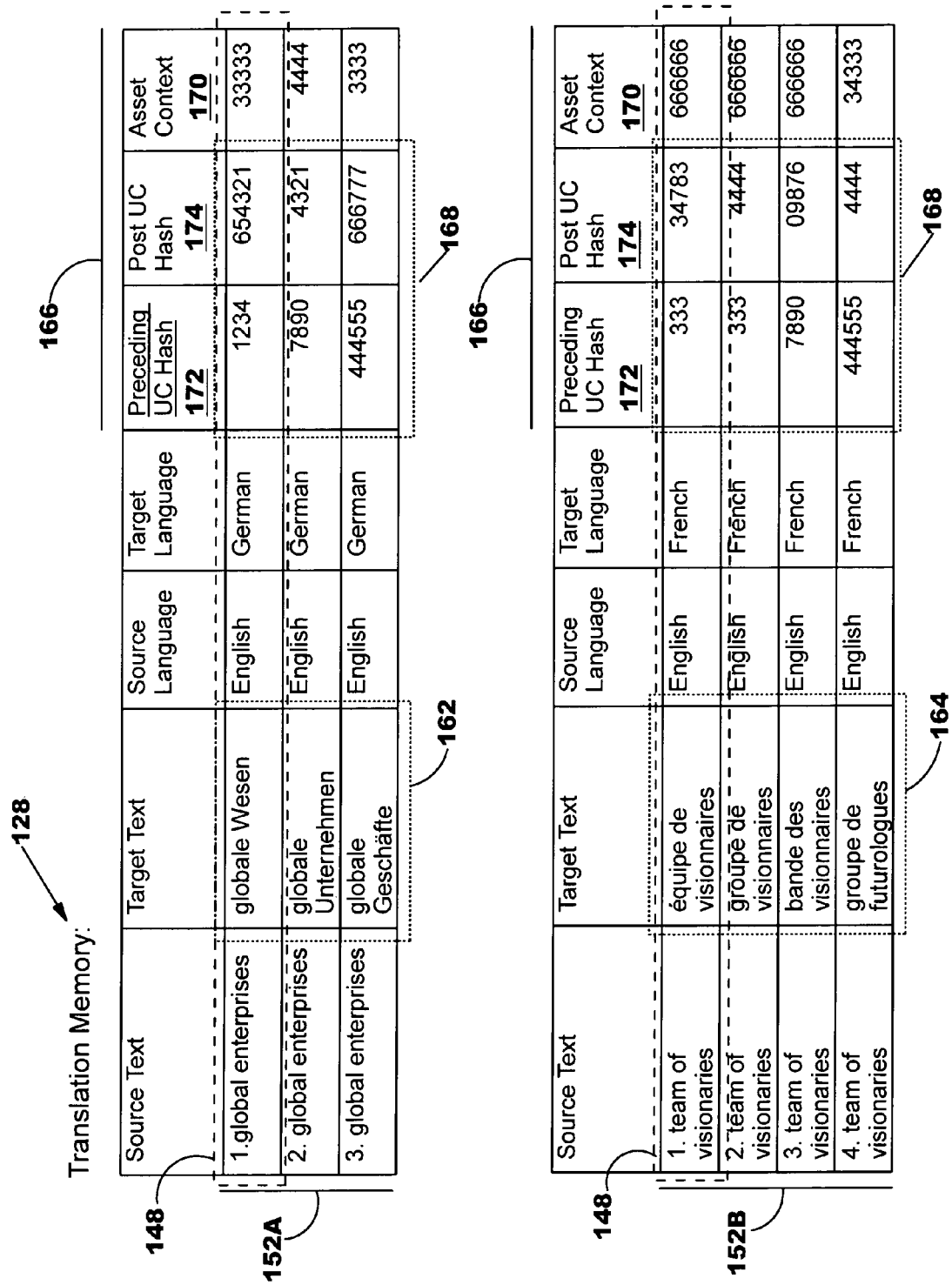
FIG. 3 shows a couple of entries in an illustrative translation memory.

FIG. 1 also shows a translation memory 128 (hereinafter "TM 128") for use by system 100. As shown in FIG. 3, TM 128 includes a plurality of TM entries 148 including stored target texts 162, 164 that have been previously translated into a particular language for particular source texts 152A, 152B, respectively (only two shown for brevity). For example, stored source text "global enterprises" 152A has been transcribed into a number of German translations 162, i.e., target texts, and stored source text "team of visionaries" 152B has been translated into a number of French translations 164, i.e., target texts. Each source text 152A, 152B is for comparison to a lookup segment. Each TM entry 148 also includes context identification 166 (only two labeled for clarity). In one embodiment, context identification 166 includes indications of different context levels such as a usage context portion 168 and an asset context portion (AC) 170. Asset context portion 170 includes an asset code, e.g., "33333," that identifies a particular asset to system 100. Other context levels may also be provided. In some cases, asset context portion 170 may be omitted.

In one preferred embodiment, each usage context portion 168 includes a preceding usage context (UC) hash code 172 and a post usage context (UC) hash code 174. Preceding UC hash code 172 is generated using hash algorithm 133 based on the text stream generated by a preceding segment that the respective source text appeared next to during translation. Similarly, post UC hash code 172 is generated using hash algorithm 133 based on the text stream generated by a following (post) segment that the respective source text appeared next to during translation. Hash algorithm 133 includes any now known or later developed hash algorithm that can convert a text stream into a unique numerical identifier. (It should be recognized that the hash codes shown are simplified for clarity.) Accordingly, each UC hash code indicates a unique usage context level for the respective source text. In an alternative embodiment, only one usage context hash code may be employed for a particular source text 152, and preceding and following segments.

Where a lookup segment 154 is assigned a context at creation, context identifications 166 may be generated using a user-specified SID, as described above, rather than hash algorithm 133.

It should be recognized that the particular codes used herein are for illustration purposes only.

IV. Operational Methodology

Figure 2A:
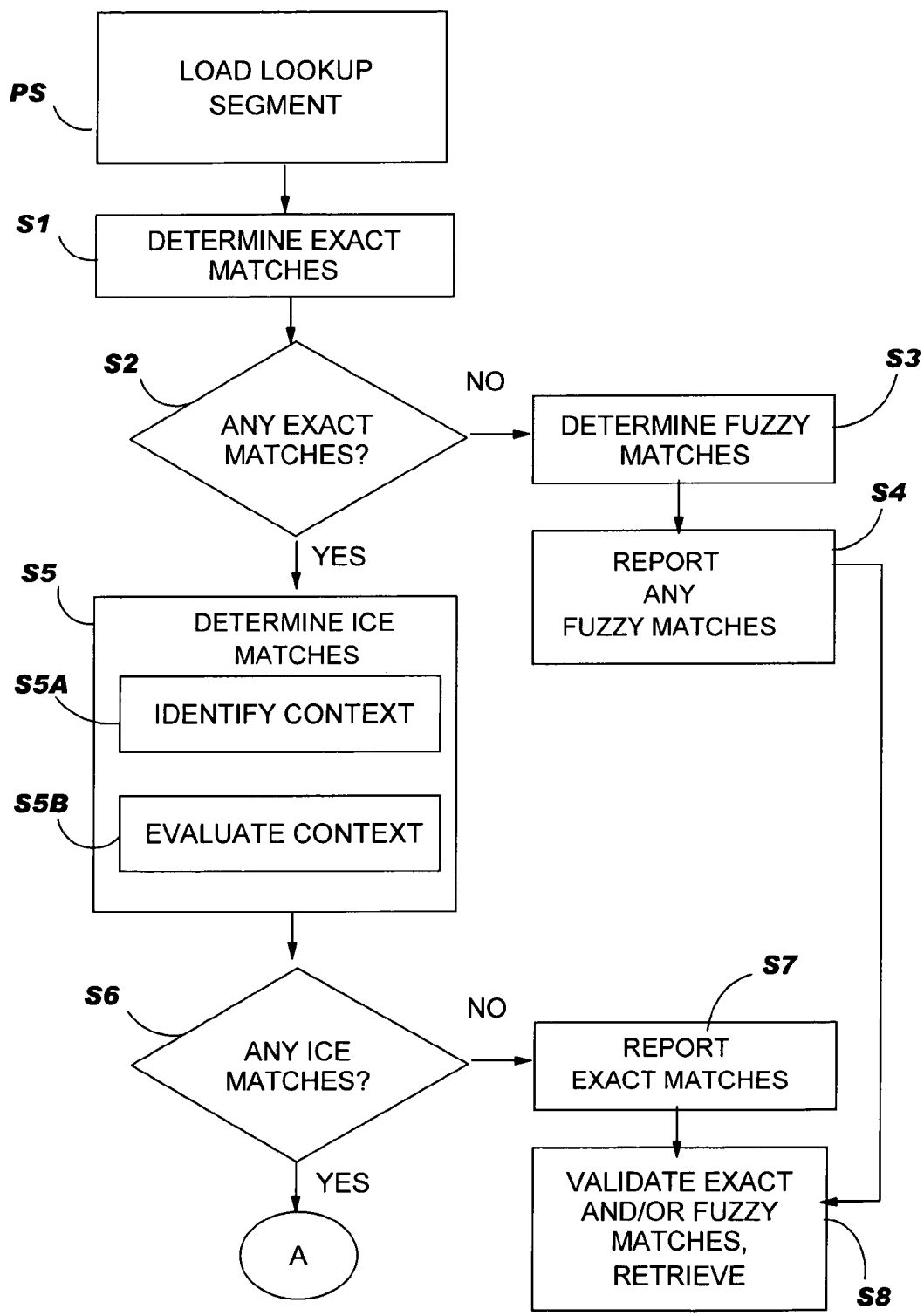
FIGS. 2A-B show a flow diagram of one embodiment of an operational methodology of the system of FIG. 1.
Figure 2B:
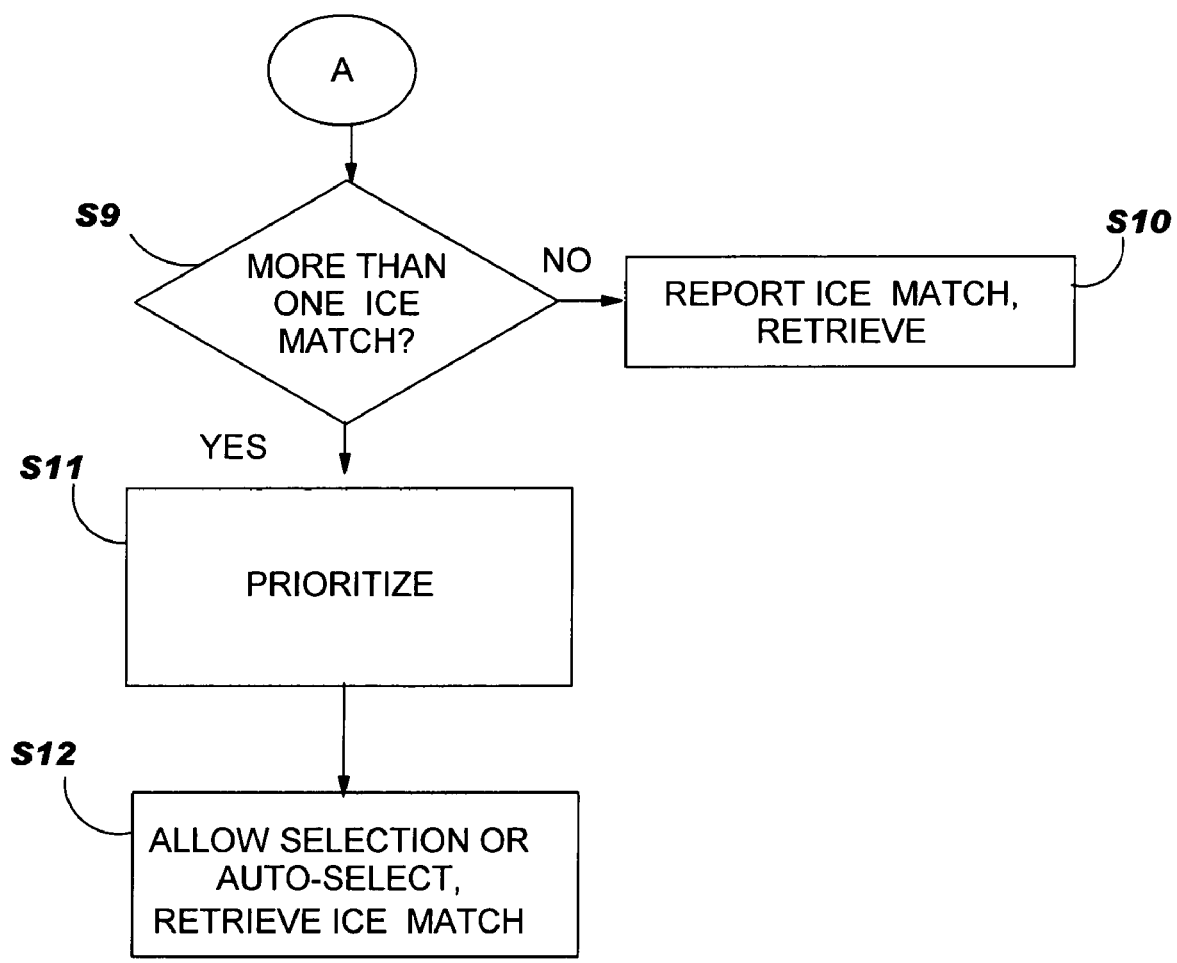

Turning to FIGS. 2A-B, a flow diagram of one embodiment of operational methodology of the invention will now be described. Discussion of FIGS. 2A-B will be made in conjunction with FIGS. 1, 3 and 4.

A. Preliminary Steps

Starting with FIG. 2A, as a preliminary step PS, in one embodiment, a lookup segment 154 is loaded by way of client computer system 150 directly linked or linked by a network of some type, e.g. a LAN, a WAN, or the Internet, to ICE match system 100. For example, lookup segment 154 may be loaded via a translation workflow application server (not shown), e.g., Idiom's WorldServer™, which ICE match system 100 may be a part of. Lookup segment 154 may be loaded as part of a larger asset. In this case, system 100 may conduct segmentation of the larger asset in any now known or later developed fashion to create lookup segments 154, e.g., as provided by Idiom's WorldServer™. Segmentation is the process through which an asset's content is parsed and exposed as translatable segments. The size of the segment depends on segmentation rules, which may be user defined.

B. General Methodology

The steps S1-S12 represent analysis for each lookup segment 154.

In a first step S1, any exact matches for lookup segment 154 in the plurality of source texts 152 in TM 128 is determined by exact match determinator 130. Exact match determinator 130 may function as in most conventional TM systems, which employ a string comparison algorithm to gauge the appropriateness of a translation stored within TM 128, where scores are awarded based on how closely the two strings match. A score of 100% typically indicates that an exact match has been found. For example, as shown in FIG. 3, lookup segment "global enterprises," when translated into German, would result in three exact matches: 1) globale Wesen, 2) globale Unternehmen, and 3) globale Geschäfte. Lookup segment "team of visionaries," when translated into French, would result in four exact matches: 1) équipe de visionnaires, 2) groupe de visionnaires, 3) bande des visionnaires, and 4) groupe de futurologues. More than one exact match may exist within TM 128 for each lookup segment 154 because multiple translations for any given segment and the meaning of a statement in a given language are not only derived from the words, but also from the context in which it is used. Accordingly, each previous translation can result in many target text translations 162, 164 for a particular source text 152, and hence, an identical lookup segment 154.

In step S2, a determination is made as to whether at least one exact match is determined, i.e., found in TM 128. If NO, at step S2, processing proceeds to step S3 at which fuzzy match determinator 134 determines whether there are any fuzzy matches for lookup segment 154 in any now known or later developed fashion. Any fuzzy matches for lookup segment 154 are reported at step S4. "Reporting" as used herein, can mean displaying results to a user, transferring and/or storing results. Although not shown, if fuzzy matches are not found, then conventional auto-translation may be instigated.

If YES at step S2, at step S5, ICE match determinator 132 determines whether a respective exact match is an in-context exact (ICE) match for lookup segment 154. As stated above, an "ICE match" means source text 152 must be an exact match and that it also shares a common context with lookup segment 154. In other words, an exact match that has a context identification 166 that matches that of lookup segment 154 is an ICE match. In one embodiment, the context for purposes of this determination includes only the usage context. However, other context matching levels may be employed, as will be described below.

Figure 4:
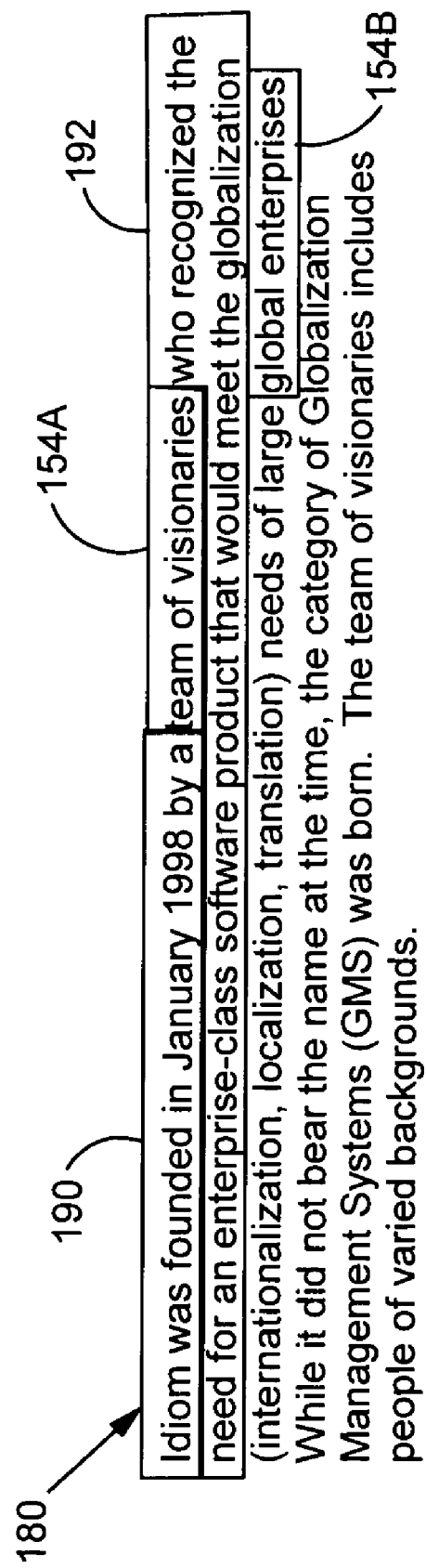
FIG. 4 shows an illustrative source asset including the entries of FIG. 3.

Step S5 includes two sub-steps. First, sub-step S5A, context identifier 142 identifies a context of lookup segment 154. In one embodiment, context identifier 142 identifies a context based on surrounding segments of lookup segment 154 in its source asset. In this case, hash algorithm 133 is implemented to determine a usage context for lookup segment 154 by calculating a lookup segment (LS) preceding UC hash code and a lookup segment (LS) post UC hash code. Again, hash algorithm 133 includes any now known or later developed hash algorithm that can convert a text stream into a unique numerical identifier. Referring to FIG. 4, an illustrative source asset 180 including lookup segment 154A in the form of "team of visionaries" is shown. A LS preceding UC hash code is formed based on the immediately preceding segment 190. For example, as shown in FIG. 4, a LS preceding UC hash code would be calculated for "Idiom was founded in January 1998 by a team of visionaries." Similarly, a LS post UC hash code would be calculated for the immediately following segment 192, i.e., "team of visionaries who recognized the need for an enterprise-class software product that would meet the globalization." An asset context for source asset 180 can be identified by context identifier 142 based on an asset hash, which is based on the system's identification of a particular asset, e.g., asset name, location within system, etc.

In an alternative embodiment, context identifier 142 identifies a context of lookup segment 154 according to a segment identifier (SID) associated with lookup segment 154, which as stated above, includes a label that defines the usage context in which a segment is to be translated. A SID may include marker tags that define segment boundaries. Preferably, a SID is associated with a source text 152 and/or lookup segment 154 during creation of the segment, i.e., by a content creator. However, a SID may be associated with a source text 152 and/or lookup segment 154, or overwritten at a later time, e.g., by a previous content translator.

In sub-step S5B, ICE match evaluator 144 makes an evaluation for each exact match for a lookup segment 154 by using context identification 166 stored with each candidate to determine whether it has been used in the same context as lookup segment 154, i.e., whether each exact match is an ICE match. The degree of context matching required in order for an exact match to be considered an ICE match can be pre-determined. In one embodiment, ICE match evaluator 144 indicates that a respective exact match is an ICE match for lookup segment 154 only in the case that each context level of lookup segment 154 matches that of the respective exact match. For example, where context includes a usage context level and an asset context level, the determining step may indicate that a respective exact match is an ICE match for the lookup segment only in the case that both the usage context level and the asset context level of the lookup segment matches that of the respective exact match.

EXAMPLE

Referring to FIG. 3, assume an illustrative lookup segment 154 includes the text "team of visionaries," and that it is to be translated into French. Also, assume the lookup segment "team of visionaries" has a LS preceding UC hash code of 333 and a LS post UC hash code of 4444, and an asset context of 666666. (It should be understood that all hash codes in FIG. 3 are simplified for purposes of clarity). As shown in FIG. 3, exact match determinator 130 would determine four exact matches for lookup segment "team of visionaries," when translated into French: 1) équipe de visionnaires, 2) groupe de visionnaires, 3) bande des visionnaires, and 4) groupe de futurologues. ICE match evaluator 144 reviews the exact matches, and as shown in FIG. 3, would determine that when lookup segment "team of visionaries" is translated into French, the source text "groupe de visionnaires" has the same context because it has the same asset context 170 and usage context (hash codes) 172, 174. Accordingly, "groupe de visionnaires" would be an ICE match. The other source texts would not qualify as ICE matches because they do not have at least one context code of lookup segment "team of visionaries."

In an alternative embodiment, ICE match evaluator 144 may indicate that a respective exact match is an ICE match for lookup segment 154 even if only some context levels of the lookup segment matches that of the respective exact match.

EXAMPLE

Referring to FIG. 3, assume an illustrative lookup segment 154 includes the text "global enterprises," and that it is to be translated into German. Also, assume the lookup segment "global enterprises" has a LS preceding UC hash code of 1234 and a LS post UC hash code of 4321, and an asset context of 7890. As shown in FIG. 3, exact match determinator 130 would determine three exact matches for lookup segment "global enterprises," when translated into German: 1) globale Wesen, 2) globale Unternehmen, and 3) globale Geschäfte. Assuming that only one usage context level is required for an exact match to be an ICE match, ICE match evaluator 144 reviews the exact matches, and as shown in FIG. 3, would determine that when lookup segment "global enterprises" is translated into German, the source texts "globale Wesen" and "globale Unternehmen" have the same context because they each have one UC hash code that matches one of LS UC hash codes. That is, "globale Wesen" has the same previous UC hash code as the lookup segment, and "globale Unternehmen" has the same post UC hash code as the lookup segment. The other source texts would not qualify as ICE matches because they do not have at least one context level of lookup segment "global enterprises." Details of how system 100 prioritizes multiple ICE matches will be described below.

If no ICE matches are determined, i.e., NO at step S6, at step S7, any exact matches are reported. Subsequently, at step S8, exact matches and fuzzy matches, i.e., from step S3-4, can be validated by a user in any now known or later developed fashion. In this case, exact matches and fuzzy matches are retrieved to their respective caches, and are made available to the translator by means of a client computer system 150 where the translator must validate each exact match in order to ensure that such match is the best match given the source asset 180 content and update each fuzzy match in order to match the source asset 180 content.

If ICE matches are determined, i.e., YES at step S6, then as shown in FIG. 2B, at step S9, ICE match ranker 146 determines whether more than one ICE match is found. If only one ICE match is determined, then at step S10, the single ICE match is reported. Once an ICE match is automatically reported, system 100 allows retrieval of the target text 162, 164 via segment retriever 138.

C. Multiple ICE Match Prioritization

Returning to FIG. 2B, step S11-12 represent optional steps for addressing the situation in which multiple ICE matches are determined in step S5, i.e., YES at step S9. In one embodiment (not shown), ICE match determinator 130 may simply allow a user to select an ICE match from a list of ICE matches. However, this is not preferred because it defeats one purpose of the ICE matches, i.e., not having to validate an exact match. In the preferred embodiment shown in FIG. 2B, if more than one ICE match is determined, then ICE match prioritizer 146 prioritizes (ranks) each ICE match according to a degree of context matching at step S11. As described above, the "degree of context matching" can be predetermined. This step prioritizes each ICE matches degree of context matching and either presents the ICE matches to a user for selection or automatically selects the highest ranked ICE match, at step S12. It should be understood that various formula for prioritizing multiple ICE matches are possible depending on the number of context levels. The following example illustrates one embodiment for prioritizing multiple ICE matches.

EXAMPLE

Assume the context includes a usage context level and an asset context level, and the lookup segment "team of visionaries" is to be translated into French using TM 128 of FIG. 3 based on a source document 180, as shown in FIG. 4. In this case, "team of visionaries" has four exact matches: 1) équipe de visionnaires, 2) groupe de visionnaires, 3) bande des visionnaires, and 4) groupe de futurologues, based on previously stored translations. Assume also that lookup segment "team of visionaries" has an LS previous UC hash code 333, an LS post UC hash code 4444 and an asset code 666666. Assume also that for an exact match to be indicated by ICE match determinator 132 as an ICE match, only one context level needs to match that of the lookup segment. In this case, each exact match is an ICE match. In particular, 1) "équipe de visionnaires" has matching previous UC hash code and asset code, 2) "groupe de visionnaires" has all matching context levels, 3) "bande des visionnaires" has a matching asset code, and 4) "groupe de futurologues" has a matching post UC hash code.

It should be recognized that, by definition, ICE matches are prioritized above unmatched lookup segments (i.e., those that require manual or machine translation), fuzzy matches, and exact matches that are not ICE matches. One prioritization rubric for ICE matches is shown below. In this rubric, rankings are listed in reverse order of precedence (i.e., the higher the number, the higher the prioritization): wherein the usage context (UC) level includes a preceding UC level and a post UC level, and the prioritizing step includes:

1. Full Usage Context (UC) Matches are Preferred Over Partial Usage Context (UC) Matches:

Assuming that exact matches that have only one UC hash code that match a hash code of the lookup segment are considered ICE matches (referred to as "partial matches"), preference is given to those ICE matches that have both the same previous and post hash UC codes as the lookup segment (referred to as "full UC matches") over the partial matches. In other words, an ICE match having both previous and post UC levels that match those of the lookup segment are preferred over an ICE match having only one of the previous and post UC levels matching those of the lookup segment. For the example, ICE match 2) "groupe de visionnaires" would be preferred over all others because it has matching preceding (333) and post (4444) UC hash codes with the lookup segment.

2. ICE Matches from Same Asset as Lookup Segment are Preferred Over Those from other Assets:

In this case, two or more ICE matches cannot be differentiated by the above-described full-over-partial matching preference, i.e., the first preference is non-conclusive, a preference is given to the ICE match that is from the same asset as the lookup segment based on the asset code. In other words, where the first preference is non-conclusive, an ICE match from the same asset as the lookup segment is preferred over an ICE match from a different asset. In the example, ICE matches 1) "équipe de visionnaires" and 4) "groupe de futurologues" are both partial ICE matches, but ICE match 1) "équipe de visionnaires" is from the same asset "666666" as the lookup segment, and would be preferred.

3. Where Two or More ICE Matches from the Same Asset are Determined for a Lookup Segment, the ICE Match with a Closer Position to the Position of Lookup Segment within the Asset is Preferred:

This prioritization addresses the situation in which a lookup segment 154 exists in numerous locations within a single source asset 180, and as a result two or more ICE matches exist for a particular asset. For example, FIG. 4 shows source asset 180 including two occurrences of lookup segment "team of visionaries" 154A, 154B. In this case, ICE match prioritizer 146 evaluates the position within the asset of the particular lookup segment and will prefer the ICE match that is closest in position within the asset to the lookup segment over the other ICE matches from the same asset. In other words, where the second preference is non-conclusive, an ICE match with a closest position to a position of the lookup segment within the asset is preferred over the other ICE matches. This evaluation of position can be repeated for any number of repetitions of a lookup segment within a particular asset.

Once the prioritization is complete, at step S12, ICE match prioritizer 146 allows a user to select the ICE match based on the rank in any now known or later developed fashion, e.g., via a graphical user interface of client computer system 150, or automatically selects the highest prioritized ICE match. Once an ICE match is selected, system 100 allows retrieval of at least one target text 162, 164 via segment retriever 138.

Because of the high-level match quality provided by an ICE match, source texts that are determined to be ICE matches do not need to be reviewed or validated by the translator. They can be automatically accepted, thus decreasing the translation cycle time and resulting in cheaper translation costs. In addition, system 100 addresses the situation in which a plurality of lookup segments 154 that are substantially identical in terms of content are present in a single source asset 180. In this case, system 100 is capable of determining an ICE match for each lookup segment 154 based on a matching level. Typically, at least one lookup segment has a different ICE match than at least one other lookup segment to assist in this determination. If not, multiple ICE matches can be reported to a user for selection, as described above. System 100 also facilitates the translation of sections of content, which are repeated across different assets with minimal effort, including without limitation retrieving matches even when segments of content have been split or merged and/or allowing content blocks to be translated differently within a single asset.

The above-described operation can continue to process further lookup segments of source asset 180 against TM 128, or provide output to a user once an entire asset is completed.

D. Generating the Translation Memory

The existence of context information for TM entries is required for system 100 operation. As such, implementation of the invention requires storage of context information with every new translation added to the TM. This allows the context information of lookup segments to be effectively compared to the context information of previously translated segments without requiring access to the previously translated documents.

Figure 5:
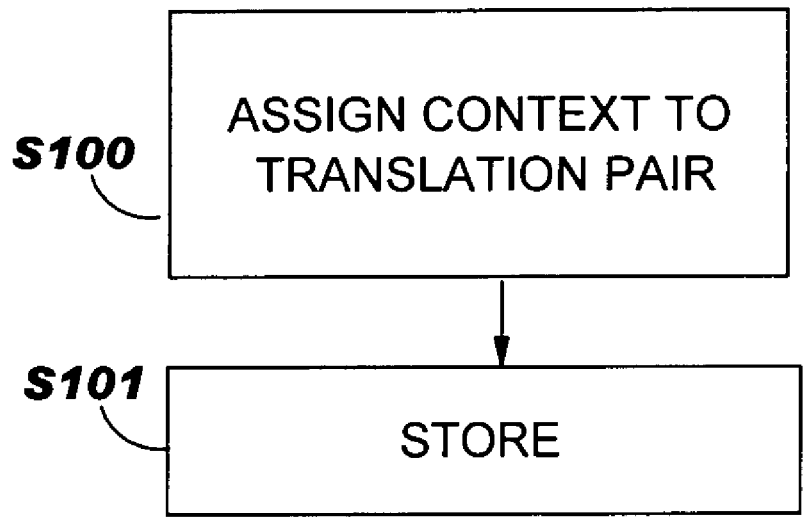
FIG. 5 shows a flow diagram of one embodiment for translation memory generation according to the invention.

Toward this end, in another embodiment, the invention provides a way through which the context information is stored along with each translation when translations are saved into TM 128, thus, not requiring a translator to keep any files around, such as the previously translated documents, for the invention to function. Turning to FIG. 5, the invention also includes a method of storing a translation pair of source text and target text in TM 128. In a first step S100, a context is assigned to the translation pair using TM generator 136. Context may be assigned, for example, by implementation of the above-described SIDs during creation of content or via operation of hash algorithm 133 during a translation pass. Next, in step S101, the context is stored with the translation pair in TM 128 by TM generator 136. As described above, the context may include a usage context level and an asset context level.

Figure 6:
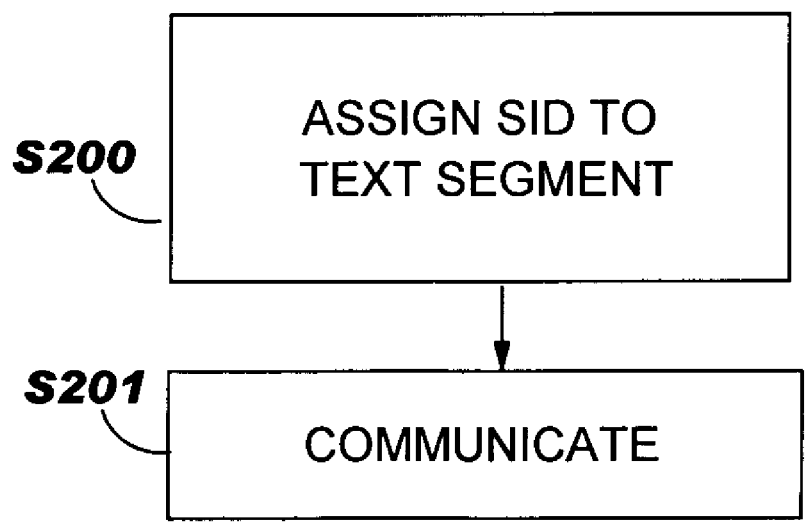
FIG. 6 shows a flow diagram of an alternative embodiment for translation memory generation according to the invention.

It should be recognized that the above-described TM generation may also be implemented on a client-side system 150 for when an asset (segment) is created. In this embodiment, the invention includes a client-side system 150 for interacting with a translation system (i.e., system 100 along with other content management system components 140) including TM 128. Turning to FIGS. 1 and 6, in this case, the client-side system 150 may operate by providing a SID assigner 200 for assigning (step S200) a segment identifier (SID) to a segment 152 to be translated by TM 128, the SID indicating a usage context of the segment. SID assigner 200 may allow a user to associate predetermined SIDs or SIDs may be generated using, for example, a hash algorithm 133. In addition, system 150 may include a communicator 202 for communicating (step S201) the SID assignment for storage as part of TM 128, e.g., by TM generator 136 of system 100.

V. Conclusion

The above-described invention provides value for translators by giving them the ability to perfectly match source content with that of the TM, alleviating the need to validate the source content with the TM and creating a truly reusable TM system, which allows for a more efficient translation process.

It is understood that the order of the above-described steps is only illustrative. To this extent, one or more steps can be performed in parallel, in a different order, at a remote time, etc. Further, one or more of the steps may not be performed in various embodiments of the invention.

It is understood that the present invention can be realized in hardware, software, a propagated signal, or any combination thereof, and may be compartmentalized other than as shown. Any kind of computer/server system(s)—or other apparatus adapted for carrying out the methods described herein—is suitable. A typical combination of hardware and software could be a general purpose computer system with a computer program that, when loaded and executed, carries out the respective methods described herein. Alternatively, a specific use computer, containing specialized hardware for carrying out one or more of the functional tasks of the invention (e.g., system 100), could be utilized. The present invention also can be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. Furthermore, it should be appreciated that the teachings of the present invention could be offered as a business method on a subscription or fee basis. For example, the system and/or computer could be created, maintained, supported and/or deployed by a service provider that offers the functions described herein for customers. That is, a service provider could offer the functionality described above.

The invention may be embodied in other specific forms without departing from the spirit or essential characteristics thereof. It is to be understood that the above-described embodiments are simply illustrative and not restrictive of the principles of the invention. Various and other modifications and changes may be made by those skilled in the art which will embody the principles of the invention and fall within the spirit and scope thereof and all changes which come within the meaning and range of the equivalency of the claims are thus intended to be embraced therein.

What is claimed is:

1. A method, performed on a computer system, for determining a matching level of a plurality of source texts stored in a translation memory to a lookup segment to be translated, the method comprising:

using the computer system to perform the following:

determining any exact matches for the lookup segment in the plurality of source texts;

determining, in the case that at least one exact match is determined, that a respective exact match is an in-context exact (ICE) match for the lookup segment in the case that a context of the lookup segment matches that of the respective exact match, wherein the context includes at least two levels, wherein the at least two levels includes a usage context level and an asset context level, the usage context level including a preceding usage context level and a post usage context level, the preceding usage context level having a preceding usage context hash code associated therewith and the post usage context level having a post usage context hash code associated therewith; and determining, in the case that greater than one ICE match is determined, a prioritization for each ICE match that is based on a degree of context matching, wherein a more appropriate ICE match is prioritized over one or more other ICE matches, wherein the prioritization includes:

first preferring an ICE match having a full usage context match with the lookup segment over an ICE match having only a partial usage context match with the lookup segment, wherein the full usage context match with the lookup segment includes a match with both the preceding usage context hash code and the post usage context hash code and the partial usage context match with the lookup segment includes a match with only one of the preceding usage context hash code and the post usage context hash code, where if the first preferring step is non-conclusive, second preferring an ICE match from the same asset as the lookup segment over an ICE match from a different asset.

2. The method of claim 1, wherein the ICE match determining indicates that a respective exact match is an ICE match for the lookup segment only in the case that each context level of the lookup segment matches that of the respective exact match.

3. The method of claim 1, wherein the ICE match determining indicates that a respective exact match is an ICE match for the lookup segment only in the case that both the usage context level and the asset context level of the lookup segment matches that of the respective exact match.

4. The method of claim 1, wherein if the second preferring is non-conclusive, third preferring an ICE match with a closest position to a position of the lookup segment within the asset.

5. The method of claim 4, further comprising allowing a user to select the ICE match based on the prioritization.

6. The method of claim 1, wherein the lookup segment includes a plurality of lookup segments that are substantially identical in terms of content, and
wherein the ICE match determining includes determining an ICE match for each lookup segment.

7. The method of claim 5, wherein at least one lookup segment has a different ICE match than at least one other lookup segment.

8. The method of claim 1, further comprising allowing retrieval of at least one source text based on the matching level.

9. A computer system for determining a matching level of a plurality of source texts stored in a translation memory to a lookup segment to be translated, the computer system comprising:
at least one processing unit;
memory operably associated with the at least one processing unit;
an in-context exact (ICE) match translation system storable in memory and executable by the at least one processing unit, the ICE translation system comprising:
an exact match determinator that determines any exact matches for the lookup segment in the plurality of source texts;
an ICE match determinator that determines in the case that at least one exact match is determined, that a respective exact match is an ICE match for the lookup segment in the case that a context of the lookup segment matches that of the respective exact match, wherein the context includes at least two levels, wherein the at least two levels includes a usage context level and an asset context level, the usage context level including a preceding usage context level and a post usage context level, the preceding usage context level having a preceding usage context hash code associated therewith and the post usage context level having a post usage context hash code associated therewith; and
an ICE match prioritizer that in the case that greater than one ICE match is determined by the ICE match determinator, prioritizes each ICE match based on a degree of context matching, wherein a more appropriate ICE match is prioritized over other ICE matches, wherein the prioritizing includes:
first preferring an ICE match having a full usage context match with the lookup segment over an ICE match having only a partial usage context match with the lookup segment, wherein the full usage context match with the lookup segment includes a match with both the preceding usage context hash code and the post usage context hash code and the partial usage context match with the lookup segment includes a match with only one of the preceding usage context hash code and the post usage context hash code,
where if the first preferring step is non-conclusive, second preferring an ICE match from the same asset as the lookup segment over an ICE match from a different asset.

10. The computer system of claim 9, wherein the ICE match determinator indicates that a respective exact match is an ICE match for the lookup segment only in the case that each context level of the lookup segment matches that of the respective exact match.

11. The computer system of claim 9, wherein the ICE match determinator indicates that a respective exact match is an ICE match for the lookup segment only in the case that both the usage context level and the asset context level of the lookup segment matches that of the respective exact match.

12. The computer system of claim 9, wherein if the second preference is non-conclusive, the ICE match prioritizer third prefers an ICE match with a closest position to a position of the lookup segment within the asset.

13. The computer system of claim 12, wherein the ICE match prioritizer allows a user to select the ICE match based on the prioritization.

14. The computer system of claim 9, wherein the lookup segment includes a plurality of lookup segments that are substantially identical in terms of content, and
wherein the ICE match determinator determines an ICE match for each lookup segment.

15. The computer system of claim 14, wherein at least one lookup segment has a different ICE match than at least one other lookup segment.

16. The computer system of claim 9, further comprising a segment retriever that allows retrieval of at least one source text based on the matching level.

17. A program product stored on a non-transitory computer readable medium, which when executed by a computer system, determines a matching level of a plurality of source texts stored in a translation memory to a lookup segment to be translated, the non-transitory computer readable medium comprising program code for performing the following:
determining any exact matches for the lookup segment in the plurality of source texts;
determining, in the case that at least one exact match is determined, that a respective exact match is an in-context exact (ICE) match for the lookup segment in the case that a context of the lookup segment matches that of the respective exact match, wherein the context includes at least two levels, wherein the at least two levels includes a usage context level and an asset context level, the usage context level including a preceding usage context level and a post usage context level, the preceding usage context level having a preceding usage context hash code associated therewith and the post usage context level having a post usage context hash code associated therewith; and
determining, in the case that greater than one ICE match is determined, a prioritization for each ICE match that is based on a degree of context matching, wherein a more appropriate ICE match is prioritized over one or more other ICE matches, wherein the prioritization includes:
first preferring an ICE match having a full usage context match with the lookup segment over an ICE match having only a partial usage context match with the lookup segment, wherein the full usage context match with the lookup segment includes a match with both the preceding usage context hash code and the post usage context hash code and the partial usage context match with the lookup segment includes a match with only one of the preceding usage context hash code and the post usage context hash code,
where if the first preferring step is non-conclusive, second preferring an ICE match from the same asset as the lookup segment over an ICE match from a different asset.

18. The program product of claim 17, wherein the ICE match determining indicates that a respective exact match is an ICE match for the lookup segment only in the case that each context level of the lookup segment matches that of the respective exact match.

19. The program product of claim 17, wherein the ICE match determining indicates that a respective exact match is an ICE match for the lookup segment only in the case that both the usage context level and the asset context level of the lookup segment matches that of the respective exact match.

20. The program product of claim 17, wherein if the second preferring is non-conclusive, third preferring an ICE match with a closest position to a position of the lookup segment within the asset.

21. The program product of claim 20, further comprising allowing a user to select the ICE match based on the prioritization.

22. The program product of claim 17, wherein the lookup segment includes a plurality of lookup segments that are substantially identical in terms of content, and
wherein the ICE match determining includes determining an ICE match for each lookup segment.

23. The program product of claim 22, wherein at least one lookup segment has a different ICE match than at least one other lookup segment.

24. The program product of claim 17, further comprising allowing retrieval of at least one source text based on the matching level.

25. A method, performed on a computer system, for determining a matching level of a plurality of translation pairs of source text and target text stored in a translation memory to a lookup segment to be translated, the method comprising:
using the computer system to perform the following:
assigning a context to each of the plurality of translation pairs stored in the translation memory, wherein the context includes a usage context level and an asset context level, the usage context level including a preceding usage context level and a post usage context level, the preceding usage context level having a preceding usage context hash code associated therewith and the post usage context level having a post usage context hash code associated therewith;
storing the context with the translation pairs in the translation memory;
determining any exact matches for the lookup segment with the plurality of translation pairs of source text and target text stored in the translation memory;
determining, in the case that at least one exact match is determined, that a respective exact match is an in-context exact (ICE) match for the lookup segment in the case that a context of the lookup segment matches that of the respective exact match; and
determining, in the case that greater than one ICE match is determined, a prioritization for each ICE match that is based on a degree of context matching, wherein a more appropriate ICE match is prioritized over one or more other ICE matches, wherein the prioritization includes:
first preferring an ICE match having a full usage context match with the lookup segment over an ICE match having only a partial usage context match with the lookup segment, wherein the full usage context match with the lookup segment includes a match with both the preceding usage context hash code and the post usage context hash code and the partial usage context match with the lookup segment includes a match with only one of the preceding usage context hash code and the post usage context hash code,
where if the first preferring step is non-conclusive, second preferring an ICE match from the same asset as the lookup segment over an ICE match from a different asset.

26. A computer system for determining a matching level of a plurality of translation pairs of source text and target text stored in a translation memory to a lookup segment to be translated, the computer system comprising:
at least one processing unit;
memory operably associated with the at least one processing unit;
an in-context exact (ICE) match translation system storable in memory and executable by the at least one processing unit, the ICE match translation system comprising:
a segment identifier assigner that assigns a context to each of the plurality of translation pairs stored in the translation memory, wherein the context includes a usage context level and an asset context level, the usage context level including a preceding usage context level and a post usage context level, the preceding usage context level having a preceding usage context hash code associated therewith and the post usage context level having a post usage context hash code associated therewith;
a translation memory generator that stores the context with each of the plurality of translation pairs in the translation memory;
an exact match determinator that determines any exact matches for the lookup segment in the plurality of translation pairs of source text and target stored in the translation memory;
an ICE match determinator that determines in the case that at least one exact match is determined, that a respective exact match is an ICE match for the lookup segment in the case that a context of the lookup segment matches that of the respective exact match; and
an ICE match prioritizer that in the case that greater than one ICE match is determined by the ICE match determinator, prioritizes each ICE match based on a degree of context matching, wherein the prioritization includes:
first preferring an ICE match having a full usage context match with the lookup segment over an ICE match having only a partial usage context match with the lookup segment, wherein the full usage context match with the lookup segment includes a match with both the preceding usage context hash code and the post usage context hash code and the partial usage context match with the lookup segment includes a match with only one of the preceding usage context hash code and the post usage context hash code,
where if the first preferring step is non-conclusive, second preferring an ICE match from the same asset as the lookup segment over an ICE match from a different asset.

27. A program product stored on a non-transitory computer readable medium, which when executed by a computer system, determines a matching level of a plurality of translated text segments stored in a translation memory to a lookup segment to be translated, the non-transitory computer readable medium comprising program code for performing the following:

assigning a context to each of the plurality of translated text segments stored in the translation memory, wherein the context includes a usage context level and an asset context level, wherein the usage context level comprises a preceding usage context hash code generated from a text stream that precedes a segment of translated text and a post usage context hash code generated from a text stream that follows the translated text segment, and wherein the asset context level comprises an asset code that identifies an asset for the translated text segment;

storing the context with the translated text segments in the translation memory;

determining any exact matches for the lookup segment with the plurality of translated text segments stored in the translation memory;

determining, in the case that at least one exact match is determined, that a respective exact match is an in-context exact (ICE) match for the lookup segment in the case that a context of the lookup segment matches that of the respective exact match; and determining, in the case that greater than one ICE match is determined, a prioritization for each ICE match that is based on a degree of context matching, wherein a more appropriate ICE match is prioritized over one or more other ICE matches, wherein the prioritization includes:

first preferring an ICE match having a full usage context match with the lookup segment over an ICE match having only a partial usage context match with the lookup segment, wherein the full usage context match with the lookup segment includes a match with both the preceding usage context hash code and the post usage context hash code and the partial usage context match with the lookup segment includes a match with only one of the preceding usage context hash code and the post usage context hash code, where if the first preferring step is non-conclusive, second preferring an ICE match from the same asset as the lookup segment over an ICE match from a different asset.

28. A computer system, comprising:

a translation memory comprising a plurality of source texts for comparison to a lookup segment; and a context identifier for each of the plurality of source texts, wherein the context identifier identifies a usage context level and an asset context level, the usage context level including a preceding usage context level and a post usage context level, the preceding usage context level having a preceding usage context hash code associated therewith and the post usage context level having a post usage context hash code associated therewith;

at least one processing unit;

memory operably associated with the at least one processing unit;

an in-context exact (ICE) match translation system storable in memory and executable by the at least one processing unit, the ICE match translation system determining a matching level of the plurality of source texts stored in the translation memory to a lookup segment to be translated, the ICE match translation system comprising an exact match determinator that determines any exact matches for the lookup segment in the plurality of source texts; an ICE match determinator that determines in the case that at least one exact match is determined, that a respective exact match is an ICE match for the lookup segment in the case that a context of the lookup segment matches that of the respective exact match; and an ICE match prioritizer that in the case that greater than one ICE match is determined by the ICE match determinator, prioritizes each ICE match based on a degree of context matching, wherein a more appropriate ICE match is prioritized over one or more other ICE matches, wherein the prioritizing includes:

first preferring an ICE match having a full usage context match with the lookup segment over an ICE match having only a partial usage context match with the lookup segment, wherein the full usage context match with the lookup segment includes a match with both the preceding usage context hash code and the post usage context hash code and the partial usage context match with the lookup segment includes a match with only one of the preceding usage context hash code and the post usage context hash code, where if the first preferring step is non-conclusive, second preferring an ICE match from the same asset as the lookup segment over an ICE match from a different asset.

29. A client-side computer system for interacting with a translation system including a translation memory having a plurality of source texts, the computer system comprising:

at least one processing unit;

memory operably associated with the at least one processing unit;

an in-context exact (ICE) match translation system storable in memory and executable by the at least one processing unit, the ICE match translation system comprising:

a segment identifier assigner that assigns a segment identifier to a segment to be translated by the translation system, the segment identifier indicating a usage context of the segment, wherein the usage context comprises a preceding usage context hash code generated from a text stream that precedes the segment to be translated and a post usage context hash code generated from a text stream that follows the segment to be translated;

a communicator that communicates the segment identifier assignment for storage as part of the translation memory;

an exact match determinator that determines any exact matches in the plurality of source texts with the segment to be translated;

an ICE match determinator that determines in the case that at least one exact match is determined, that a respective exact match is an ICE match for the segment in the case that a context of the segment matches that of the respective exact match, wherein the context includes at least two levels, wherein the at least two levels includes a usage context level and an asset context level; and an ICE match prioritizer that in the case that greater than one ICE match is determined by the ICE match determinator, prioritizes each ICE match based on a degree of context matching, wherein a more appropriate ICE match is prioritized over one or more other ICE matches, wherein the prioritization includes:

first preferring an ICE match having a full usage context match with the lookup segment over an ICE match having only a partial usage context match with the lookup segment, wherein the full usage context match with the lookup segment includes a match with both the preceding usage context hash code and the post usage context hash code and the partial usage context match with the lookup segment includes a match with only one of the preceding usage context hash code and the post usage context hash code, where if the first preferring step is non-conclusive, second preferring an ICE match from the same asset as the lookup segment over an ICE match from a different asset.

30. A program product stored on a non-transitory computer readable medium, which when executed by a computer system, interacts with a translation system including a translation memory having a plurality of source texts, the non-transitory computer readable medium comprising program code for performing the following:

assigning a segment identifier to a segment to be translated by the translation system, the segment identifier indicating a usage context of the segment, wherein the usage context comprises a preceding usage context hash code generated from a text stream that precedes the segment to be translated and a post usage context hash code generated from a text stream that follows the segment to be translated;

communicating the segment identifier assignment for storage as part of the translation memory;

determining any exact matches for the segment with the plurality of source texts stored in the translation memory;

determining, in the case that at least one exact match is determined, that a respective exact match is an in-context exact (ICE) match for the segment in the case that a context of the segment matches that of the respective exact match, wherein the context includes at least two levels, wherein the at least two levels includes a usage context level and an asset context level, the usage context level including a preceding usage context level and a post usage context level, the preceding usage context level having the preceding usage context hash code associated therewith and the post usage context level having the post usage context hash code associated therewith; and determining, in the case that greater than one ICE match is determined, a prioritization for each ICE match that is based on a degree of context matching, wherein a more appropriate ICE match is prioritized over one or more other ICE matches, wherein the prioritization includes:

first preferring an ICE match having a full usage context match with the lookup segment over an ICE match having only a partial usage context match with the lookup segment, wherein the full usage context match with the lookup segment includes a match with both the preceding usage context hash code and the post usage context hash code and the partial usage context match with the lookup segment includes a match with only one of the preceding usage context hash code and the post usage context hash code, where if the first preferring step is non-conclusive, second preferring an ICE match from the same asset as the lookup segment over an ICE match from a different asset.

31. The method of claim 25, wherein the preceding usage context hash code is generated from a hash algorithm that operates on a text stream that precedes the source text and the post usage context (UC) hash code is generated from the hash algorithm that operates on a text stream that follows the source text, and wherein the asset context level comprises an asset code that identifies an asset for the source text.

32. The computer system of claim 26, wherein the preceding usage context hash code is generated from a hash algorithm that operates on a text stream that precedes the source text and the post usage context hash code is generated from the hash algorithm that operates on a text stream that follows the source text, and wherein the asset context level comprises an asset code that identifies an asset for the source text.

33. The computer system of claim 28, wherein the preceding usage context hash code is generated from a hash algorithm that operates on a text stream that precedes the source text and the post usage context hash code is generated from the hash algorithm that operates on a text stream that follows the source text, and wherein the asset context level comprises an asset code that identifies an asset for the source text.

34. The method of claim 4, wherein the preceding usage context hash code is generated from a text stream that precedes the segment to be translated and the post usage context hash code is generated from a text stream that follows the segment to be translated.

35. The computer system of claim 12, wherein the preceding usage context hash code is generated from a text stream that precedes the segment to be translated and the post usage context hash code is generated from a text stream that follows the segment to be translated.

36. The program product of claim 20, wherein the preceding usage context hash code is generated from a text stream that precedes the segment to be translated and the post usage context hash code is generated from a text stream that follows the segment to be translated.

* * * * *